United States Patent [19]

Kaiwa et al.

[11] Patent Number: 4,609,790

[45] Date of Patent: Sep. 2, 1986

[54] LOCKING APPARATUS FOR TELEPHONE

[75] Inventors: Ryoichi Kaiwa, Yokohama; Yuichiro Suganuma, Yokosuka, both of Japan

[73] Assignee: Matsushita Electric Industrial Co., Ltd., Kadoma, Japan

[21] Appl. No.: 655,097

[22] Filed: Sep. 27, 1984

[51] Int. Cl.4 .......... H04M 1/06; H04M 1/02; H04M 1/04

[52] U.S. Cl. .......... 179/189 R; 179/100 R; 179/158 R

[58] Field of Search .......... 179/189 R, 100 R, 178, 179/103, 158 R, 167, 102

[56] References Cited

U.S. PATENT DOCUMENTS 4,117,276 9/1978 Zurawski .......... 179/161
4,476,354 10/1984 Uchino et al. .......... 179/189 R

FOREIGN PATENT DOCUMENTS 29255 2/1983 Japan .......... 179/146 R

Primary Examiner—Gene Z. Rubinson
Assistant Examiner—Danita R. Byrd
Attorney, Agent, or Firm—Wenderoth, Lind & Ponack

[57] ABSTRACT

A locking apparatus for a telephone which has a handset and a base unit, the locking apparatus having engaging recessed parts provided respectively in the transmitter part and receiver part of the handset, and engaging members provided on the base unit projecting radially outwardly at positions corresponding to the recessed parts, the handset being locked by pressing the handset onto said base unit from above, and releasing the handset from the base unit by pushing the handset up from below by a push-up apparatus provided on the base unit.

7 Claims, 5 Drawing Figures

LOCKING APPARATUS FOR TELEPHONE

FIELD OF INVENTION

The present invention relates to a locking apparatus for mounting a handset on a base unit of a telephone to be mounted on a moving body such as an automobile which is subject to drastic vibration or shock.

BACKGROUND

A conventional telephone of this type is shown in FIG. 1 and FIG. 2, and in both figures, the handset 1 rests on the base unit. In FIG. 1, grooves 3 are provided on the inside of handset 1, and projections 4 held on base unit 2 by plate springs are provided. In this type of telephone, there is a defect that the handset 1 can be detached from the base unit 2 by drastic vibration or shock. In FIG. 2, a groove 5 is provided at the rear edge of the receiving part of handset 1, and a hook 6 is provided which engages with said groove 5, a stop 7 supports the rear edge of said handset 1, and an unlocking button 8 is provided to unlock said hook 6. In this type of telephone, there is a defect that handset 1 must be depressed after the rear edge of this handset 1 has been set against stop 7 on base unit 2, and thus the motion to place the handset 1 on base unit 2 is not simple. Further, there is a defect that the link mechanism between the button 8 and hook 6 is complex since the operating direction of the unlocking button 8 and hook 6 differs from the other.

SUMMARY OF INVENTION

An object of the present invention is to prevent a handset from jumping out of a base due to vibration or shock without harming its operational effectiveness, especially to provide a locking apparatus for telephone suitable for automobile service.

Another object of the present invention is to provide such a locking apparatus which can be locked onto a base unit only be pressing on the handset, so that the operation is superior since attaching and detaching of handset can be performed without having to move the handset in other directions.

Another object of the present invention is to provide an unlocking mechanism by which detaching of the handset is easy moreover and the mechanism therefor is simple.

Still another object is to provide a locking apparatus in which a push-up member also functions as a hook-switch.

DESCRIPTION OF THE PREFERRED EMBODIMENT

The telephone of the present invention is characterized by having a handset and a base unit, the handset having engaging recesses, one at the rear edge of the receiver part and one at the front edge of the transmitter part of the handset, and having an engaging member on the base capable of being engaged in or disengaged from said engaging recesses, an elastic body engaging said engaging member with said engaging recesses by urging said engaging member in a protruding direction, and a push-up apparatus to push the body part of the handset up in a disengaging direction.

Figure 4:
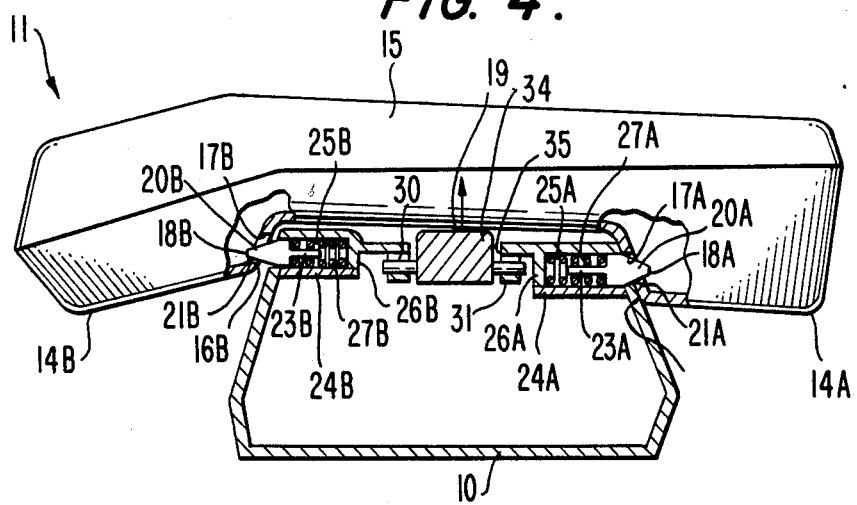
FIG. 4 is a side view of the same telephone with the base unit and part of the handset in section.
Figure 3:
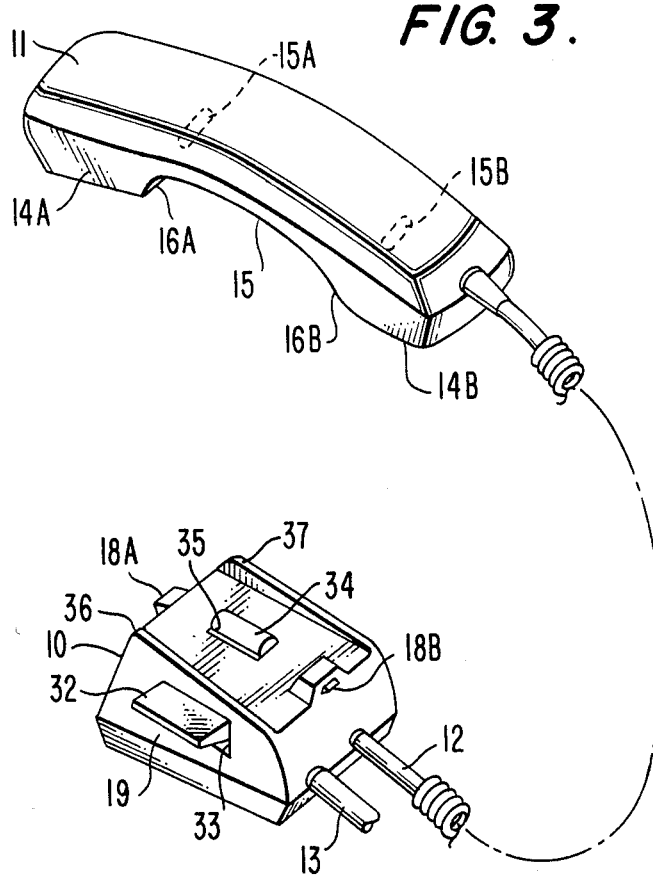
FIG. 3 is a perspective view showing one practical embodiment of a telephone of the present invention.
Figure 5:
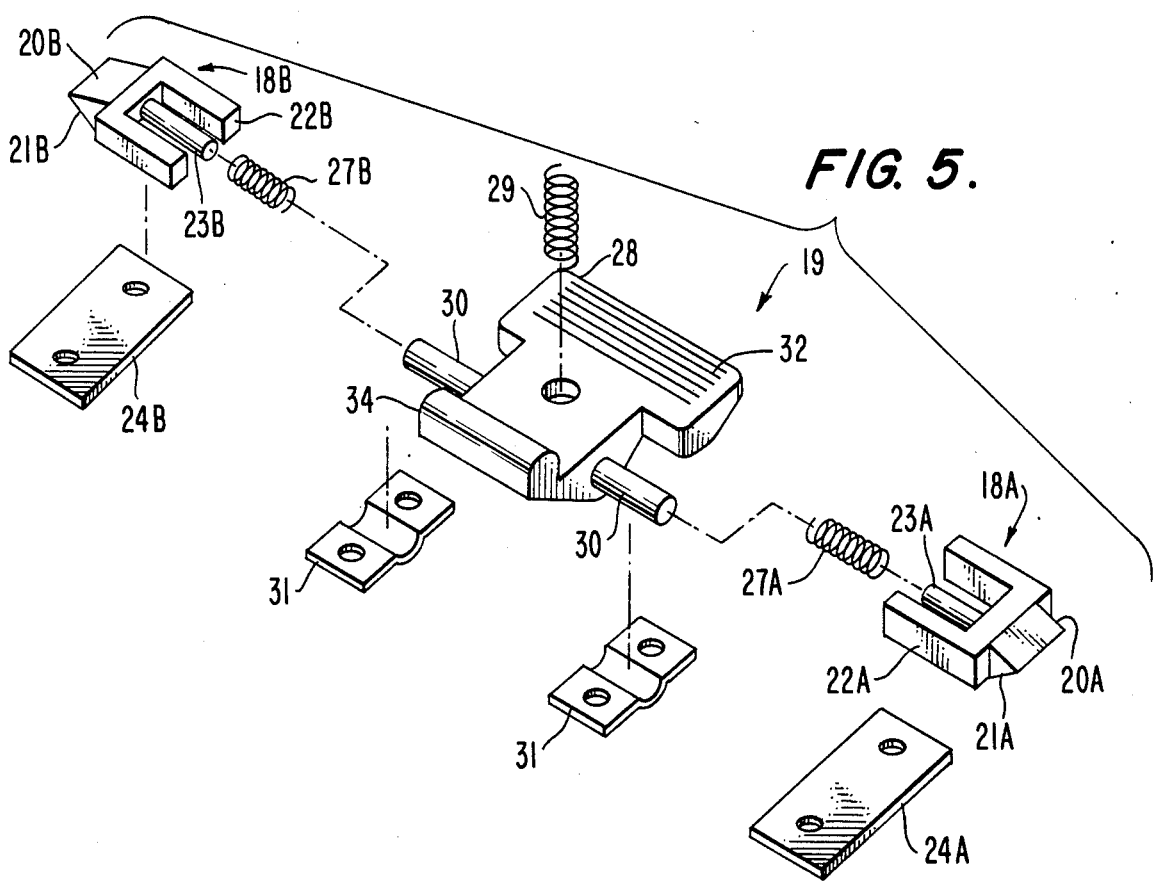
FIG. 5 is an exploded perspective view of the main part of the same telephone.

In the following, one preferred embodiment of the present invention will be described in detail with reference to the drawings. In FIG. 3 and FIG. 4, a base unit 10 has a handset 11 electronically connected thereto by a handset cord, and a cord 13 connects the base unit 10 to a telephone system. The receiver part 14A and the transmitter part 14B project in the same direction from the handset. The receiver part 14A and the transmitter part 14B of said handset 11 have inclined faces 16A and 16B which are opposed to each other and open outwards and are spaced from the central part of body part 15 so as to facilitate the locking and unlocking operation, and groove-shaped engaging recesses 17A and 17B are formed in said inclined faces 16A and 16B. Two engaging members 18A and 18B are provided on base unit 10 and lock handset 11 thereto by engaging in said engaging recesses 17A and 17B, and a handset push-up apparatus is also provided on said base unit 10. As shown in FIG. 3 through FIG. 5, said engaging members 18A and 18B have upper and lower faces at the outer ends which end in inclined faces 20A, 20B, 21A and 21B forming V-cross-section tips and shafts 23A and 23B are provided in the inside central spaces of U-shaped base parts 22A and 22B. Fixed plates 24A and 24B are secured to the inside of the upper parts of base unit 10, and recess defining parts 25A and 25B are provided in the top wall of the base unit to define with the fixed plates two laterally outwardly open recesses in which base parts 22A and 22B are slidably positioned. Thus engaging members 18A and 18B are supported under said recessed parts 25A and 25B so that they can slide in and out of the recesses. Compressed springs 27A and 27B are inserted between the back walls 26A and 26B of the recesses and engaging members 18A and 18B around the outer periphery of shafts 23A and 23B, and the tip ends of each engaging member 18A and 18B protrude out of the recesses under the action of these compressed springs 27A and 27B. The handset push-up apparatus 19 has push-up member 28, compressed spring 29, pins 30 protruding from both sides of the central part of push-up member 28 and rotatably supported in bracket 31 attached to the top of base unit 10 inside the central part thereof, and an operating part 32 is protruding out of a hole 33 formed in base unit 10. Compressed spring 29 is inserted between push-up member 28 and the top of base unit 10 between pins 30 and operating part 32 of push-up member 28. The end opposite member 28 has a pressing part 34 protruding upward through hole 35 in the top of base unit 10. Said push-up member 28 may function to operate a hook-switch. As such a hook-switch, there can be used a known micro-switch which is ON-OFF operated in conjunction with vertical movement of the pressing part 34, which can thus be regarded as a hook-lever.

The operation of the present invention will be explained. First, the motion to lock handset 11 after placing it onto base unit 10 will be described. Handset 11 is set between protruding walls 36 and 37 on the top of base unit 10 so that inclined faces 16A and 16B on receiver part 14A and transmitter part 14B of handset 11 nip the ends of base unit 10 where parts 25A and 25B are located, and handset 11 is pressed. Thereby push-up member 28 is pushed down against the elasticity of compressed spring 29 and also inclined faces 20A and 20B on engaging members 18A and 18B are pressed by the inclined faces 16A and 16B, and engaging members 18A and 18B are forced to recede against the elasticity of compressed springs 27A and 27B. By pressing handset 11 still more, grooves 17A and 17B pass the pointed tips of members 18A and 18B and receded engaging members 18A and 18B are pushed out by the force of compressed springs 27A and 27B, and engage in opposed engaging grooves 17A and 17B. The handset 11 is thereby held securely on base unit 10. In this state, handset 11 cannot be slipped off even if the body part 15 of handset 11 is raised by ordinary force, or by vibration or shock.

When handset 11 is to be removed and transmitting performed, operating part 32 of push-up lever 28 is pressed down and push-up member 28 is turned about pivot pins 30, and pressing part 34 is raised. This raising force is an extremely large force because the distance from the fulcrum at the pivot pin to operating part 32 is much larger than the distance to the pressing part 34. By this raising, body part 15 of handset 11 is pushed up, and inclined faces 21A and 21B on the lower sides of engaging members 18A and 18B are pressed by the lower edges of engaging recesses 17A and 17B, and engaging members 18A and 18B are caused to recede against the elastic force of compressed springs 27A and 27B by a component in the horizontal direction, and are thus disengaged from engaging recesses 17A and 17B of handset 11. After this disengaging, handset 11 is raised by the torque of push-up member 28 due to the elasticity of compressed spring 29, and locking is released. After disengaging of the handset 11, the tips of engaging members 18A and 18B protrude out of recesses beneath parts 25A and 25B ready for the next locking of the handset 11.

Figure 1:
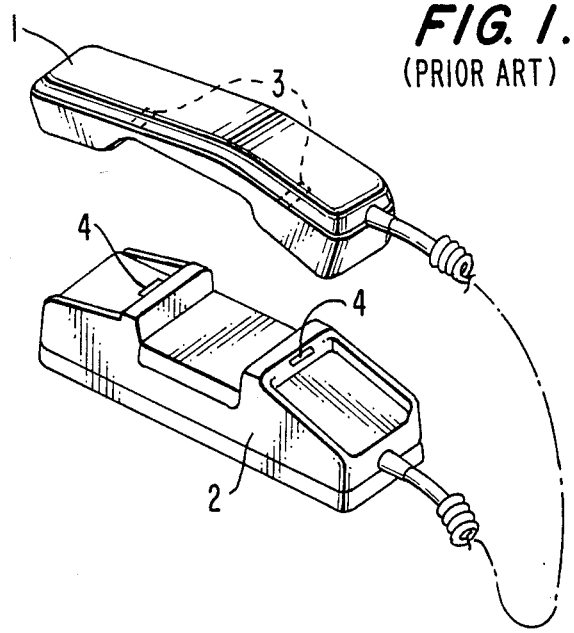
FIG. 1 and FIG. 2 are perspective views showing conventional telephones.

In contrast, in the conventional device shown in FIG. 1, when the plate spring pushing nail 4 outwards is made strong to prevent slipping of the handset 1 due to vibration of a vehicle etc., a large force is necessary to remove the handset and operational ease is lost.

In the present invention, since the raising force of pressing part 34 is utilized as a supplementary force, the spring force of springs 27A and 27B on members 18A and 18B can be made sufficiently strong.

Figure 2:
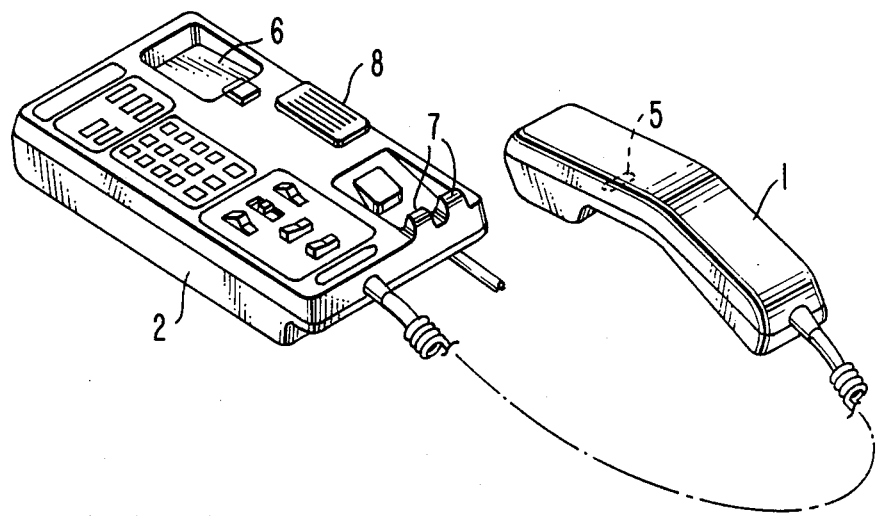

In the conventional device of FIG. 2, since the direction of motion (vertical) of the unlocking button and the direction of motion (front and rear) of hook 6 differ from each other, a complicated link mechanism becomes necessary to cause the hook 6 to be withdrawn by operation of the unhooking button 8. In the present invention, since all that is necessary is pushing up the body part of the handset 11 from below by operational part 32, the interlocking mechanism with engaging members 18 becomes unnecessary, and thus locking and unlocking of the handset can be achieved by a simple mechanism.

What we claim is:

1. A telephone with a locking means for locking a handset thereof to a base unit thereof, comprising:

the handset having a receiver part projecting from one end and having an outer end, a transmitter part projecting from the other end in the same direction as said receiver part and having an outer end and having a side face thereon opposed to a corresponding side face on said receiver part with said opposed faces of said receiver and transmitter parts having groove-shaped recesses therein with outer edges;

the base unit having side faces with upper portions and over which said handset fits with said opposed faces adjacent said upper portions of said side faces of said base unit;

engaging members mounted in said base unit adjacent the upper portion thereof and resiliently slidable into and out of said base unit and normally urged outwardly of said base unit and having outer ends for engaging in said recesses when said handset is positioned on said base unit, said outer ends of said engaging members having a shape for being urged inwardly of said base unit, when engaged by the outer end of said transmitter part and the outer end of said receiver part as said handset is moving toward said base unit, for allowing said recesses to pass said outer ends of said engaging members and allowing said engaging members to snap resiliently back into said grooved-shaped recesses, and for, when engaged by the outer edges of the respective recesses as said handset is moving away from said base unit, being urged inwardly of said base unit for allowing the receiver part and the transmitter part to move past said engaging members; and means on said base for being actuated for exerting a removing force on said handset for moving said handset to cause said outer edges of said recesses to force said engaging members into said base unit.

2. A telephone as claimed in claim 1 in which said engaging members each have a flat top tapered surface tapering downwardly toward the outer end and a flat bottom tapered surface tapering upwardly toward the outer end and converging with said top tapered surface.

3. A telephone as claimed in claim 1 in which the opposed faces on said receiver part and said transmitter part diverge away from each other.

4. A telephone as claimed in claim 1 in which said means on said base for being actuated comprises a lever pivotally mounted in said base unit having an operating part projecting out of said base unit laterally thereof and a pressing part projecting upwardly out of said base unit where said handset rests when in position on said base unit.

5. A telephone as claimed in claim 4 further comprising a spring means in said base unit engaged with said lever for urging said operating part in a downward direction.

6. A telephone as claimed in claim 4 in which said lever further actuates a hook switch when said operating part is actuated to raise said handset.

7. A telephone as claimed in claim 1 in which said base unit has opposite edges and has upwardly protruding walls on said opposite edges for guiding said handset into position on said base unit.

* * * * *